United States Patent
Schwartz

[15] 3,650,654
[45] Mar. 21, 1972

[54] INJECTION MOLDING MACHINE
[72] Inventor: William H. Schwartz, University Heights, Ohio
[73] Assignee: Lester Engineering Company, Cleveland, Ohio
[22] Filed: Jan. 24, 1969
[21] Appl. No.: 793,838

[52] U.S. Cl. .............................. 425/243, 425/245, 425/247
[51] Int. Cl. ........................................................... B29f 1/02
[58] Field of Search .......... 18/30 AA, 30 AC, 30 AM, 30 AP, 18/30 AR, 30 AS, 30 G, 30 Q, 30 QM, 30 QQ, 30 RV, 30 RM, 30 WT, 30 WI, 30 WR, 30 FJ

[56] References Cited

UNITED STATES PATENTS

| | | | |
|---|---|---|---|
| 2,239,338 | 4/1941 | Norelli | 18/30 RV |
| 2,477,258 | 7/1949 | MacMillin | 18/30 FJ |
| 2,479,383 | 8/1949 | MacMillin | 18/30 FJ |

FOREIGN PATENTS OR APPLICATIONS

| | | | |
|---|---|---|---|
| 1,118,166 | 3/1956 | France | 18/30 AP |
| 1,195,860 | 5/1958 | France | 18/30 AA |

Primary Examiner—Robert D. Baldwin
Assistant Examiner—Michael O. Sutton
Attorney—Oberlin, Maky, Donnelly & Renner

[57] ABSTRACT

An injection molding machine including a shot cylinder which is indexed between an inject and shot preparation position, the cylinder in the latter position having forced therein under high pressure the plastic material forming the shot.

7 Claims, 3 Drawing Figures

Patented March 21, 1972

INVENTOR
WILLIAM H. SCHWARTZ

BY Oberlin, Maky, Donnelly & Renner
ATTORNEYS

Patented March 21, 1972

INVENTOR
WILLIAM H. SCHWARTZ

BY
Oberlin, Maky, Donnelly & Renner
ATTORNEYS

INJECTION MOLDING MACHINE

This invention relates generally as indicated to an injection molding machine and more particularly to a machine for the efficient molding of hard to mold materials such as polyesters reinforced with fiber glass.

Such hard to mold materials normally cannot be sent through a screw and must be prepared in batches having limited bench life.

It is accordingly a principal object of the present invention to provide a machine having particular utility in the molding of hard to mold materials such as polyesters having fiber glass therein.

Another principal object is the provision of such machine utilizing a shot cylinder which can be indexed between a shot inject and a shot preparation position.

A further object is the provision of such machine wherein a plastic material is forced into the shot cylinder under high pressure in the shot preparation position of the latter.

Still another object is the provision of a simplified and efficient machine for economically forming parts of hard to mold plastics such as fiber glass reinforced polyesters.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
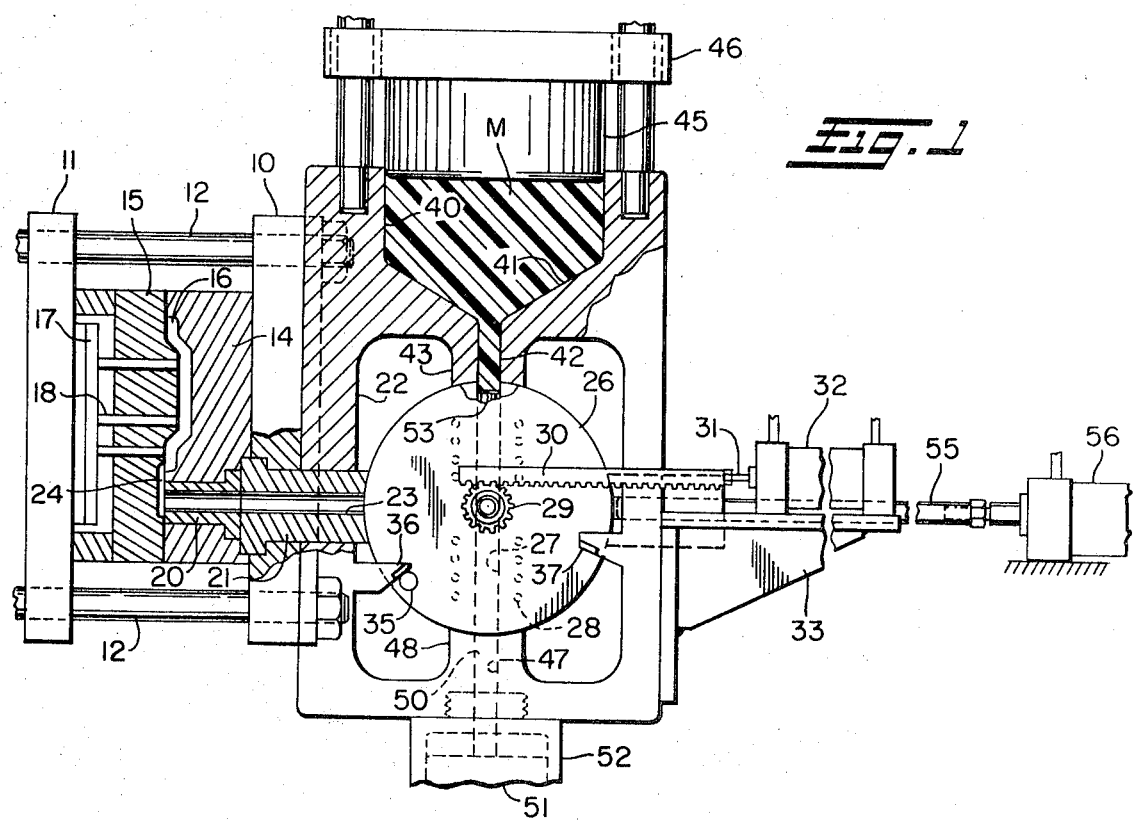
FIG. 1 is a fragmentary view of an injection molding machine partially broken away and in section in accordance with the present invention showing the shot cylinder in the shot preparation position.

Referring now to FIG. 1, it will be seen that the machine includes a fixed die platen 10 and a movable die platen 11, the latter being mounted for movement along tie bars 12 by a clamping mechanism, not shown. Such tie bars may be four in number. The movable platen 11 may be moved toward and away from the fixed platen 10 and clamped in mold closed position by the mechanism seen, for example, in applicant's copending application, Ser. No. 781,552, filed Dec. 5, 1968, entitled "Injection Molding Machine," and now U.S. Pat. No. 3,588,957.

A mold half or die 14 is mounted on the fixed platen 10 and cooperates with a mold half or die 15 mounted on the movable die platen 11. The two cooperate to form a mold cavity shown generally at 16. The movable die platen includes an ejector mechanism 17 which includes ejector pins 18 which are extended when the mold is opened to discharge the finished product from the movable mold half 15.

The fixed mold half 14 includes a cylindrical insert 20 aligned with slightly larger cylindrical insert 21 mounted in the fixed die platen 10 and extending into shot frame 22 mounted on the shot end of the machine. The cylindrical members 20 and 21 have axially aligned cylindrical passages therein shown at 23 in communication with runner 24 leading to the mold cavity 16.

Journaled generally centrally within the shot frame 22 is a shot wheel member 26 which includes, extending diametrically therethrough, a shot cylinder 27. The shot cylinder may include heating elements 28 surrounding the same to facilitate the plasticizing of the plastic material M therewithin. The wheel 26 may include oppositely projecting trunnions journaled within opposite sides of the frame 22 and on one such trunnion there is provided a pinion 29 in mesh with rack 30 reciprocated by the rod 31 of double-acting piston-cylinder assembly 32 mounted on bracket 33 secured to the frame 22.

The wheel 26 may include a laterally projecting stop rod 35 which engages inwardly projecting stops 36 and 37 in alternate positions of the wheel.

The top of the frame 22 includes a relatively large diameter cylindrical chamber 40 into which the plastic material M is introduced. Such cylindrical chamber at its lower end includes a conical surface 41, the apex of which terminates in cylindrical passage 42 passing centrally through inwardly directed projection 43 in the frame 22.

The cylindrical chamber 40 receives a large diameter squeeze piston 45, the cylinder assembly of which may be mounted on the frame plate 46. The piston exerts a substantial amount of pressure on the plastic material M within such chamber.

The passage 42 is aligned with passage 47 in the bottom of the frame 22 which extends upwardly through inwardly extending projection 48. Mounted for reciprocation in the passage 47 is a backup plunger 50. The backup plunger 50 is connected to the piston 51 of piston-cylinder assembly 52 mounted on the bottom of the frame 22. The tip 53 of the backup plunger 50 in its retracted position just clears the wheel 26 as seen in FIG. 2.

Diametrically opposite the passage 23 in the cylindrical members 20 and 21 is a bushing 54 supporting injection plunger 55 which is actuated by piston-cylinder assembly 56. When the tip 57 of the injection plunger is retracted, it will just clear the wheel 26 as indicated in FIGS. 1 and 2.

In FIG. 1, the wheel 26 has been indexed to place the shot cylinder 27 in a vertical position aligned with the passages 42 and 47. This is accomplished by retraction of the rack 30 and the engagement of the stop 35 against the stop 36. A charge of plastic material is placed within the chamber 40 and the high pressure ram 45 is brought down to close the top of the chamber. The backup piston 50 is extended until the tip 53 of such backup plunger is in the approximate position seen in FIG. 1. The ram 45 is now brought down forcing the plastic material under high pressure through the passage 42 and into the shot cylinder 27. The pressure created by the ram 45 will cause the backup plunger 50 to back off or retreat. This may be accomplished by bleeding hydraulic fluid from the blind end of the cylinder 52. In any event, the plastic material is placed under high pressure between the ram 45 and the backup plunger 50. While the shot is thus being prepared and plasticized, both by the pressure exerted thereon and the heat obtained from the heating elements 28, the mold closing mechanism will move the molds into juxtaposition as seen and a clamping force will be exerted thereon.

Figure 2:
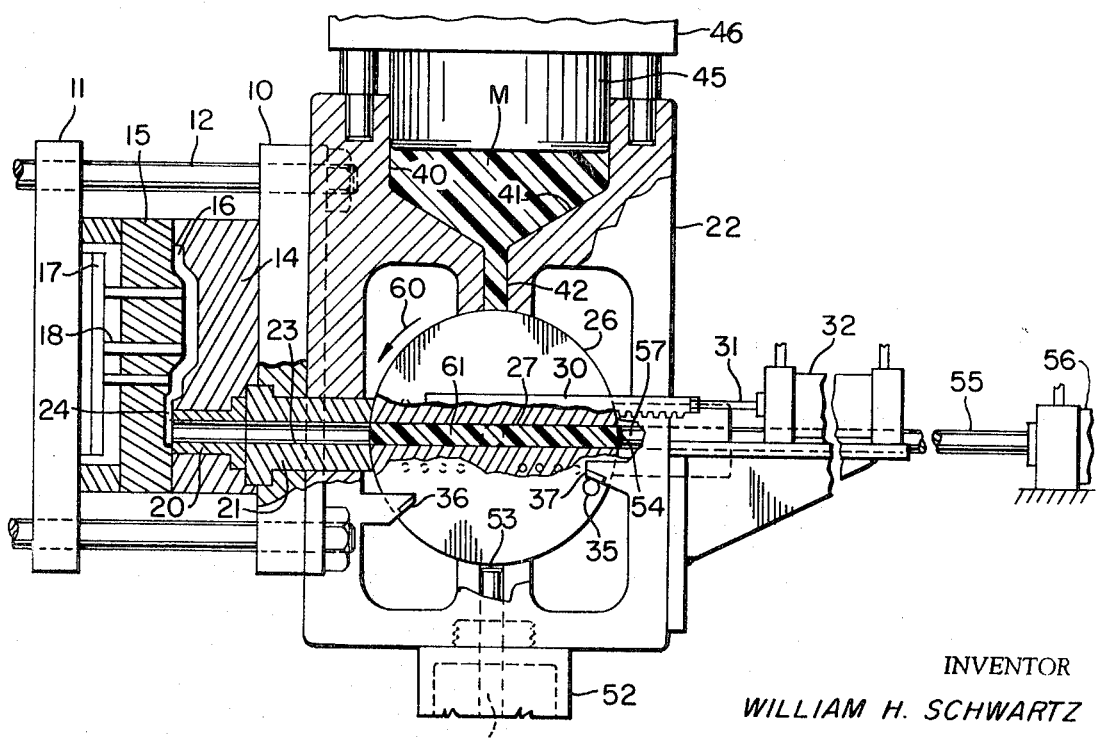
FIG. 2 is a view similar to FIG. 1 showing the shot cylinder indexed 90° prior to the institution of the shot.

Referring now to FIG. 2, when the tip 53 of the backup plunger is in the position shown, the wheel 26 is now indexed in the direction of the arrow 60 aligning the shot cylinder 27 and the plastic charge 61 therein with the passage 23 on the one hand and the shot plunger 55 on the other. Indexing of the wheel is accomplished by extension of the piston-cylinder assembly 32 placing the stop 35 now against the stop 37. The tip 53 of the backup plunger 50 must, of course, clear the wheel and be in the position seen in FIG. 2.

Figure 3:
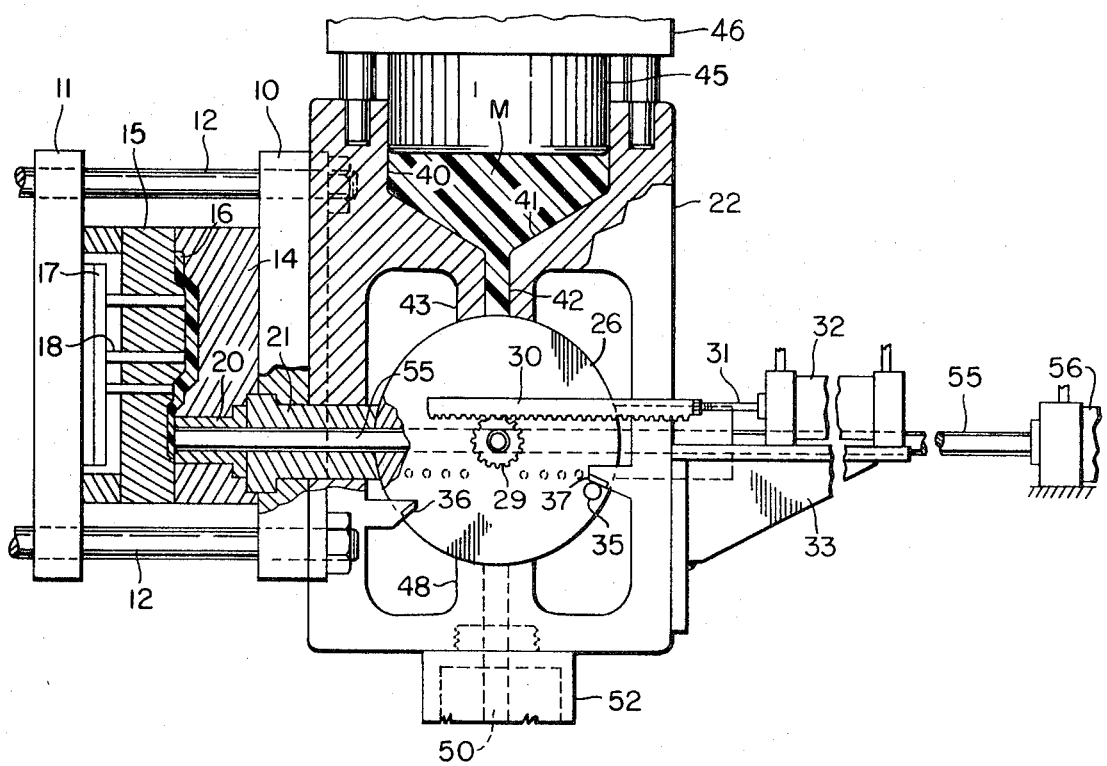
FIG. 3 is a view similar to FIGS. 1 and 2 showing the completion of the shot.

Referring now to FIG. 3, it will be seen that the injection or shot ram is now extended passing through the shot cylinder within the wheel and into the passage 23 filling the mold cavity 16. The shot ram is then retracted until the tip 57 clears the wheel as seen in FIG. 2 and the wheel may then be indexed back to the position seen in FIG. 1 so that the shot cylinder 27 is in position to receive another shot or charge of plastic material. The backup plunger 50 will be extended until its tip 53 is in the position shown in FIG. 1 and the large ram 45 is then utilized to prepare another shot within the shot cylinder within the wheel 26. While the shot is being prepared, the completed mold may be removed from the separable mold halves.

It can now be seen that there is provided an injection molding machine and method wherein the shot cylinder is indexed from a shot preparation position to a shot inject position, the shot cylinder when thus indexed being aligned with the shot plunger.

I, therefore, particularly point out and distinctly claim as my invention:

1. An injection molding machine comprising a pair of separable die holders adapted to support a pair of separable dies, an indexable member, a shot cylinder, a shot preparation means, a shot plunger, and means in said member to index said member and thus said cylinder from a shot preparation and reception position to a shot inject position and vice versa, said member being supported for rotation about an axis passing through said shot cylinder, the shot preparation means including a high pressure ram and a backup plunger that are in communication with said cylinder in the shot preparation and reception position, the backup plunger being aligned with and positioned in the cylinder before shot insertion and being driven out of said cylinder during insertion by said ram compressing plastic material against said plunger and concurrently forcing such material into said cylinder, the cylinder in said inject position being in communication with such separable dies and aligned with said shot plunger.

2. An injection molding machine as set forth in claim 1 wherein said shot preparation means further includes heating means surrounding said cylinder.

3. An injection molding machine as set forth in claim 1 wherein said backup plunger is connected to the piston of a piston-cylinder assembly, the compressive pressure exerted on said material being controlled at selected magnitudes by bleeding hydraulic fluid from the cylinder when such pressure magnitudes obtain.

4. An injection molding machine as set forth in claim 1 wherein said cylinder is supported by a wheel member which is rotated to index said cylinder.

5. An injection molding machine as set forth in claim 1 including a rack and pinion drive operative to index said cylinder, said rack being operated by a double acting piston-cylinder assembly.

6. An injection molding machine as set forth in claim 1 wherein said cylinder is adapted to be pivotally moved and said indexing means pivots said cylinder approximately 90° between said positions.

7. An injection molding machine as set forth in claim 1 wherein said indexing means moves said cylinder to a vertical orientation in said preparation and reception position and to a horizontal orientation in said inject position.

* * * * *